(12) United States Patent
Karremans et al.

(10) Patent No.: US 8,445,568 B2
(45) Date of Patent: May 21, 2013

(54) FLAME RETARDANT THERMOPLASTIC COMPOSITION AND ARTICLES FORMED THEREFROM

(75) Inventors: Arjan Karremans, Roosendaal (NL); Christianus Johannes Jacobus Maas, Rilland (NL); Joshua Arie van den Bogerd, Tholen (NL); Andries Adriaan Volkers, Wouw (NL)

(73) Assignee: Sabic Innovative Plastics IP B.V. (NL)

(*) Notice: Subject to any disclaimer, the term of this patent is extended or adjusted under 35 U.S.C. 154(b) by 286 days.

(21) Appl. No.: 12/237,410

(22) Filed: Sep. 25, 2008

(65) Prior Publication Data
US 2010/0280160 A1    Nov. 4, 2010

(51) Int. Cl.
*C08K 5/42*    (2006.01)

(52) U.S. Cl.
USPC .......................................................... 524/162

(58) Field of Classification Search
USPC .................................. 524/164, 162
See application file for complete search history.

(56) References Cited

U.S. PATENT DOCUMENTS

| | | |
|---|---|---|
| 3,742,083 A | 6/1973 | Bialous |
| 3,775,367 A | 11/1973 | Nouvertne |
| 3,816,367 A | 6/1974 | Larkin et al. |
| 3,833,685 A | 9/1974 | Wambach |
| 3,842,889 A | 10/1974 | Jones |
| 3,929,908 A | 12/1975 | Orlando et al. |
| 3,933,730 A | 1/1976 | Hoogeboom |
| 4,026,913 A | 5/1977 | Tanigaichi et al. |
| 4,081,750 A | 3/1978 | Herr et al. |
| 4,092,291 A | 5/1978 | Mark |
| 4,095,760 A | 6/1978 | Sommer et al. |
| 4,110,299 A | 8/1978 | Mark |
| 4,123,436 A | 10/1978 | Holub et al. |
| 4,170,711 A | 10/1979 | Orlando et al. |
| 4,188,475 A | 2/1980 | Margotte |
| 4,223,100 A | 9/1980 | Reinert |
| 4,231,920 A * | 11/1980 | Mark et al. .................. 524/163 |
| 4,391,935 A | 7/1983 | Bialous et al. |
| 4,438,231 A | 3/1984 | Liu |
| 4,471,104 A | 9/1984 | Krishnan et al. |
| 4,519,154 A | 5/1985 | Molari, Jr. |
| 4,550,058 A | 10/1985 | Collins et al. |
| 4,609,514 A | 9/1986 | Kyle et al. |
| 4,626,563 A | 12/1986 | Ogoe et al. |
| 4,716,196 A | 12/1987 | Hilton et al. |
| 4,767,810 A | 8/1988 | Nelson |
| 4,824,723 A | 4/1989 | Campbell et al. |
| 4,880,850 A | 11/1989 | Nelson et al. |
| 4,896,922 A * | 1/1990 | Guthe ..................... 301/64.702 |
| 4,916,194 A | 4/1990 | Policastro et al. |
| 4,918,125 A | 4/1990 | Boutni |
| 4,923,933 A | 5/1990 | Curry |
| 4,933,424 A | 6/1990 | Rosenquist |
| 5,006,572 A | 4/1991 | Lundy et al. |
| 5,010,148 A | 4/1991 | Lewis |
| 5,089,207 A | 2/1992 | Hammond et al. |
| 5,118,726 A | 6/1992 | Mizutani et al. |
| 5,126,404 A | 6/1992 | Eckel et al. |
| 5,175,198 A | 12/1992 | Minnick et al. |
| 5,182,325 A | 1/1993 | Claesen et al. |
| 5,184,659 A | 2/1993 | Alcocer |
| 5,306,456 A | 4/1994 | Suhadolnik et al. |
| 5,426,170 A | 6/1995 | Hirao et al. |
| 5,436,286 A | 7/1995 | Kao et al. |
| 5,445,872 A | 8/1995 | Suhadolnik et al. |
| 5,458,966 A | 10/1995 | Matsumoto et al. |
| 5,486,555 A | 1/1996 | Hirata et al. |
| 5,672,645 A | 9/1997 | Eckel et al. |
| 5,741,838 A | 4/1998 | Fuhr et al. |
| 5,807,908 A | 9/1998 | Hirose et al. |
| 5,816,307 A | 10/1998 | Sanz |
| 5,902,683 A | 5/1999 | Sieloff |
| 5,902,753 A | 5/1999 | DeMott et al. |
| 5,955,542 A | 9/1999 | Davis et al. |
| 6,031,036 A | 2/2000 | Rosenquist et al. |
| 6,040,367 A | 3/2000 | Miya et al. |
| 6,092,915 A | 7/2000 | Rensch |
| 6,136,441 A | 10/2000 | MacGregor et al. |
| 6,180,702 B1 | 1/2001 | Chung et al. |

(Continued)

FOREIGN PATENT DOCUMENTS

| | | |
|---|---|---|
| EP | 0272416 A2 | 6/1988 |
| EP | 0507547 A2 | 10/1992 |

(Continued)

OTHER PUBLICATIONS

International Search Report; International Application No. PCT/IB2009/054042; International Filing Date: Sep. 16, 2009; Date of Mailing: Jun. 10, 2010; 6 Pages.
Written Opinion of the International Search Report; International Application No. PCT/IB2009/054042; International Filing Date: Sep. 16, 2009; Date of Mailing: Jun. 10, 2010; 5 Pages.
Japanese Patent No. 4328156; Date of Publication: Nov. 17, 1992; Abstract Only; 1 page.
Japanese Patent No. 5239331; Date of Publication: Sep. 17, 1993; Abstract Only; 1 page.
Japanese Patent No. 5247197; Date of Publication: Sep. 24, 1993; Abstract Only; 13 pages.
Japanese Patent No. 7082362; Date of Publication: Mar. 28, 1995; Abstract Only; 26 pages.

(Continued)

*Primary Examiner* — John Uselding
(74) *Attorney, Agent, or Firm* — Cantor Colburn LLP

(57) ABSTRACT

A thermoplastic composition can comprise: polycarbonate, aromatic sulphone sulphonate, aromatic sulphonate, and brominated polycarbonate. In an embodiment, when the composition is formed into a 3 mm thick extruded sheet, the sheet can have a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii).

29 Claims, No Drawings

U.S. PATENT DOCUMENTS

| | | |
|---|---|---|
| 6,221,939 B1 | 4/2001 | Campbell et al. |
| 6,297,300 B1 | 10/2001 | Van Nuffel |
| 6,353,046 B1 | 3/2002 | Rosenquist et al. |
| 6,376,584 B1 | 4/2002 | Galbo et al. |
| 6,420,512 B1 | 7/2002 | McCloskey et al. |
| 6,433,046 B1 | 8/2002 | Campbell et al. |
| 6,451,906 B1 | 9/2002 | Saito et al. |
| 6,455,171 B2 | 9/2002 | Scheibelhoffer et al. |
| 6,481,486 B1 | 11/2002 | Sanz et al. |
| 6,518,357 B1 | 2/2003 | Rajagopalan et al. |
| 6,541,548 B2 | 4/2003 | Weidner et al. |
| 6,596,893 B2 | 7/2003 | Nakacho et al. |
| 6,641,920 B2 | 11/2003 | Conn et al. |
| 6,657,018 B1 | 12/2003 | Hoover |
| 6,740,697 B1 | 5/2004 | Brenner et al. |
| 6,758,255 B2 | 7/2004 | Sanz et al. |
| 6,861,129 B2 | 3/2005 | Reilly et al. |
| 6,870,025 B2 | 3/2005 | McCloskey et al. |
| 6,872,798 B2 | 3/2005 | Bumann et al. |
| 6,960,641 B2 | 11/2005 | O'Neil et al. |
| 6,995,204 B2 | 2/2006 | Endou et al. |
| 7,144,935 B2 | 12/2006 | Seidel et al. |
| 7,166,687 B2 | 1/2007 | Venderbosch et al. |
| 7,223,804 B2 | 5/2007 | An et al. |
| 7,258,923 B2 | 8/2007 | van den Bogerd et al. |
| 7,279,594 B2 | 10/2007 | Donea et al. |
| 7,303,810 B2 | 12/2007 | Goodson et al. |
| 7,449,506 B2 | 11/2008 | Sato |
| 7,652,083 B2 | 1/2010 | Mullen |
| 7,709,562 B2 | 5/2010 | Li et al. |
| 2002/0115762 A1 | 8/2002 | Chung et al. |
| 2002/0177643 A1 | 11/2002 | Dobler et al. |
| 2003/0211291 A1 | 11/2003 | Castiglione et al. |
| 2004/0232598 A1 | 11/2004 | Donea et al. |
| 2005/0095433 A1 | 5/2005 | Bogerd et al. |
| 2005/0113535 A1 | 5/2005 | Glasgow et al. |
| 2005/0288407 A1 | 12/2005 | Heuer et al. |
| 2006/0018627 A1 | 1/2006 | Kasai |
| 2006/0078743 A1 | 4/2006 | Champlin et al. |
| 2006/0240242 A1 * | 10/2006 | Raghavendran et al. .. 428/304.4 |
| 2006/0287429 A1 | 12/2006 | Gaggar et al. |
| 2007/0100059 A1 | 5/2007 | Mullen |
| 2007/0129492 A1 | 6/2007 | Colborn et al. |
| 2007/0191518 A1 | 8/2007 | Chen et al. |
| 2007/0191519 A1 | 8/2007 | Jiao et al. |
| 2008/0081855 A1 | 4/2008 | Mullen |
| 2008/0081892 A1 | 4/2008 | Di et al. |

FOREIGN PATENT DOCUMENTS

| | | |
|---|---|---|
| EP | 0522753 A2 | 1/1993 |
| EP | 0525338 A1 | 2/1993 |
| EP | 0640646 A1 | 3/1995 |
| EP | 0753540 A2 | 1/1997 |
| EP | 1221459 A1 | 7/2002 |
| EP | 1464483 A1 | 10/2004 |
| EP | 1859927 A2 | 11/2007 |
| WO | 2008060714 A2 | 5/2008 |

OTHER PUBLICATIONS

Japanese Patent No. 7090074; Date of Publication: Apr. 4, 1995; Abstract Only; 30 pages.

Japanese Patent No. 63051429; Date of Publication: Mar. 4, 1988; Abstract Only; 1 page.

Okamoto, "Relationship Between the End-Cap Structure of Polycarbonates and Their Impact Resistance", Polymer, vol. 42, (2001), pp. 8355-8359.

Japanese Patent No. 19920049701; Date of Publication: Mar. 6, 1992; Abstract Only; 1 page.

ASTM D1003-00, Procedure A, Illuminat C; Standard Test Method for Haze and Luminous Transmittance of Transparent Plastics; Published: Jul. 2000.

Huang, S.J. et al, "Polycarbonate Networks and Semi-Interpenetrating Networks From Biphenol-A-Polycarbonate Dicyanates", Poly. Prep. American Chemical Society Div. Polym. Chem., 1992, 33(1); pp. 950-951.

ASTM E662-06; Standard Test Method for Specific Optical Density of Smoke Generated by Solid Materials; Published Aug. 2006; West Conshohocken, PA.

U.S. Appl. No. 12/237,408, filed Sep. 25, 2008; "Flame Retardant Thermoplastic Composition and Articles Formed Therefrom".

Tachikawa, et al., "Development of Polymer Films Containing Tris-(Sulfonyloxy)benzene Analogs for Gamma Rays Detection", Journal of Photopolymer Science and Technology, vol. 17, No. 1 (2004); pp. 81-86.

14 C.F.R. 25.853, Appendix F, Part I(a)(1)(ii); Effective Sep. 2, 2003.

Japanese Patent No. 2000-226505; Date of Publication: Aug. 15, 2000; Abstract Only; 2 pages.

JP 05-239332; Publication Date: Sep. 17, 1993 (translation of abstract only).

European Patent No. 0640655 (A2); Publication Date: Mar. 1, 1995; Abstract Only; 1 Page.

Japanese Patent No. 2001239637 (A); Publication Date: Sep. 4, 2001; Abstract Only; 1 Page.

Bayer Material Science; "Makrolon SF800 Z and SF805"; Technical Information Sheet; Edition Sep. 21, 2009; 7 Pages.

Schimtz, Peter et al., "Films." Ullmann's Encyclopedia of Industrial Chemistry, 5th Ed., vol. A11 (1988), pp. 85-110.

* cited by examiner

FLAME RETARDANT THERMOPLASTIC COMPOSITION AND ARTICLES FORMED THEREFROM

BACKGROUND

The present disclosure generally relates to thermoplastic compositions, and more particularly, to flame retardant polycarbonate compositions.

Transparent polycarbonate sheet materials are commonly used in aircraft and other transportation interior applications. The transparent polycarbonate sheets can be used in interior applications, such as partition walls, ceiling panels, cabinet walls, storage compartments, galley surfaces, light panels, and the like. All of these applications have various fire safety requirements that the materials must meet in order to be used in the interior applications. Various requirements have been placed on the flame retardance and smoke generating properties of the materials used in the construction of these interior panels and parts. Particular requirements include smoke density and flame spread. In the United States, Federal Aviation Regulation (FAR) Part 25.853 lays out the air worthiness standards for aircraft compartment interiors. The safety standards for aircraft and transportation systems used in Europe include a smoke density test specified in FAR 25.5 Appendix F, Part V. Flammability requirements include the "60 seconds test" specified in FAR 25.853(a) and (a-1). In another example, the aircraft manufacturer Airbus has smoke density and other safety requirements set forth in ABD0031.

Materials that can meet or exceed all the various safety requirements for aircraft interior components are desired by the aircraft industry. In view of the current interior compartment material safety standards, and in anticipation of future more stringent standards, materials that exceed governmental and aircraft manufacturer requirements are sought. Moreover, cost pressures in the industry have directed efforts toward the development of these thermoplastic polycarbonate materials with improved flammability and safety characteristics.

BRIEF SUMMARY

Disclosed herein are flame retardant thermoplastic compositions and articles formed therefrom for use in aircraft and transportation interiors. In one embodiment, a flame retardant thermoplastic composition can comprise polycarbonate, an aromatic sulphonate; an aromatic sulphone sulphonate; and brominated polycarbonate.

In another embodiment, a sheet can comprise a thermoplastic composition comprising a polycarbonate resin; an aromatic sulphonate; an aromatic sulphone sulphonate; and a brominated polycarbonate resin. The sheet when 3 mm thick, has a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii), and has a haze level of less than or equal to 4% as measured in accordance with ASTM D1003-00, Procedure A, illuminant C.

In still another embodiment, a thermoplastic composition comprises: 0.01 wt % to 0.1 wt % an aromatic sulphonate; 0.01 wt % to 0.6 wt % an aromatic sulphone sulphonate; a brominated polycarbonate resin, in an amount such that the composition comprises 0.26 wt % to 2.6 wt % bromine; and a polycarbonate resin.

The above-described and other features are exemplified by the following Figures and detailed description.

DETAILED DESCRIPTION

As discussed above, current flame retardant polycarbonate does not meet all flame retardant and smoke density requirements. For example, a flame retardant polycarbonate sheet can comprise halogen additives (e.g., a brominated polycarbonate) in order to pass the Federal Aviation Regulation (FAR) Part 25.853 flammability tests, but the halogen will cause the sheet to emit more smoke when burned. The material, therefore, can have issues passing some of the smoke generation standards.

Disclosed herein are transparent flame retardant thermoplastic polycarbonate sheet compositions that can be employed, for example, in aircraft or other transportation interiors. The polycarbonate compositions comprise less halogenated flame retardant material than current flame retardant polycarbonate sheet compositions, yet are able to meet the flammability and safety requirements for use in aircraft interiors. By reducing the amount of halogen flame retardant (e.g., bromine) in the composition, the thermoplastic polycarbonate sheet satisfies the smoke density and flammability tests. For current flame retardant polycarbonates used in aircraft interior applications, the flammability rating and the smoke density standards are conflicting requirements. Halogenated flame retardants, such as bromine, are used in the polycarbonate compositions for their effectiveness in improving flame spread properties of the sheet and satisfying the stringent aircraft interior flammability standards. Brominated flame retardant additives, however, cause an increase in smoke when the sheet compositions are ignited. The flame retardant thermoplastic polycarbonate compositions described herein advantageously utilize a reduced amount of brominated polycarbonate in combination with an aromatic sulphone sulphonate (e.g., potassium diphenyl sulphon-3-sulphonate (KSS)) flame retardant salt and an aromatic sulphonate (e.g., sodium toluene sulphonic acid (NaTS)) flame retardant to produce a transparent sheet that satisfies both the flammability and smoke density tests.

In one embodiment, a thermoplastic resin composition can comprise: polycarbonate resin, an aromatic sulphonate, an aromatic sulphone sulphonate, and a brominated polycarbonate. The composition, when in the form of a 3 mm extruded sheet, passes both a smoke density test as set forth in ASTM E662-06 and a flammability test as set forth in 14 C.F.R. 25.853, Appendix F, Part I(a)(1)(ii). The aromatic sulphone sulphonate (e.g., alkali metal sulphone sulphonate such as potassium diphenyl sulphone sulphonate) can be present in an amount of 0.01 wt % to 0.6 wt %, based on the total weight of the composition, specifically, 0.1 wt % to 0.4 wt %. The aromatic sulphonate (e.g., alkali metal salt of toluene sulfonic acid such as sodium toluene sulphonic acid) can be present in an amount of 0.01 wt % to 0.1 wt %, based on the total weight of the composition, specifically, 0.02 wt % to 0.06 wt %. The brominated polycarbonate can comprise 24 wt % to 28 wt % bromine, based on the total weight of the brominated polycarbonate. The brominated polycarbonate can be present in an amount of 1 wt % to 10 wt %, based on the total weight of the composition, specifically, 2 wt % to 8 wt %, based on the total weight of the polycarbonate resin. The brominated polycarbonate can be present in an amount such that the composition comprises 0.25 wt % to 2.5 wt % bromine, based upon a total weight of the composition. Also included herein are compositions comprising any combination of the above elements that, when in the form of a 3 mm extruded sheet, passes both a smoke density test as set forth in ASTM E662-06 and a flammability test as set forth in 14 C.F.R. 25.853, Appendix F, Part I(a)(1)(ii), and optionally has a haze level of less than or equal to 4% as measured in accordance with ASTM D1003-00, Procedure A, illuminant C. These elements can (amounts, properties, etc.) also be present, alone and in combination, in the embodiments below so long as the properties identified in the embodiments are met.

For example, in another embodiment, a thermoplastic composition can comprise 0.01 wt % to 0.1 wt % aromatic sulphonate; 0.01 wt % to 0.6 wt % aromatic sulphone sulphonate; brominated polycarbonate, in an amount such that the composition comprises 0.25 wt % to 2.5 wt % bromine; and balance polycarbonate.

The above compositions can be formed into a sheet. For example, a sheet comprising a haze level of less than or equal to 4% as measured in accordance with ASTM D1003-00, Procedure A, illuminant C. The sheet can be formed into an aircraft interior component, such as a partition wall, cabinet wall, sidewall panel, ceiling panel, floor panel, equipment panel, light panel, window molding, window slide, storage compartment, galley surface, equipment housing, seat housing, speaker housing, duct housing, storage housing, shelf, tray, or a combination comprising at least one of the foregoing.

The flame retardant thermoplastic polycarbonate compositions utilize the combination of the an aromatic sulphonate, an aromatic sulphone sulphonate, and a brominated polycarbonate resin in quantities effective to pass the flammability and smoke generation limits set forth for aircraft interior applications. As used herein, a composition achieving the flammability rating means a composition which satisfies 14 C.F.R. 25.853 Appendix F, Part I(a)(1)(ii). In pertinent part, the test described therein states the material must be self-extinguishing when tested vertically, and the average burn length may not exceed 8 inches (203 millimeters), and the average flame time after removal of the flame source may not exceed 15 seconds. Moreover, the test states that drippings from the test specimen may not continue to flame for more than an average of 3 seconds after falling. For simplicity sake, this test will be referred to as the "flammability test" going forward. Also as used herein, a composition satisfying the smoke generation requirements for aircraft compartment interiors means a composition which satisfies American Society for Testing and Materials (ASTM) standard E662 (2006). This test method uses a photometric scale to measure the density of smoke generated by the material. Polycarbonate sheets satisfying the smoke generation requirements for aircraft interiors have a smoke density of less than 200, in accordance with ASTM E662-06. Again, for simplicity sake, this test will now be referred to as the "smoke density test". While these tests were chosen to show the ability of the flame retardant polycarbonate composition described herein to satisfy both the smoke generation and flammability requirements for aircraft interiors, the composition can advantageously comply with other related flammability and safety tests. Examples of other such tests can include, without limitation, FR-One tests, such as NF P 92-505, Airbus aircraft manufacturer tests, such as ABD0031, and the like.

Again, the flame retardant thermoplastic polycarbonate composition described herein comprises a polycarbonate resin containing a brominated polycarbonate, with an aromatic sulphonate and an aromatic sulphone sulphonate added thereto. These three components present in the polycarbonate composition can be present in any amount effective to satisfy both the flammability test and the smoke density test. Exemplary concentrations of each component in the final flame retardant polycarbonate composition are discussed in detail below.

The aromatic sulphone sulphonate in the thermoplastic composition can be represented by the following formula (I).

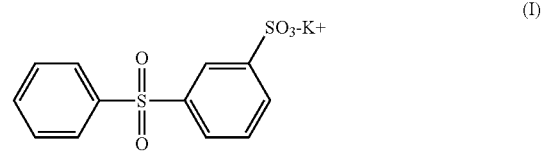

It is understood that other aromatic sulphone sulphonates that attained the desired results are also included. For example, the aromatic sulphone sulphonate can comprises a formula (K-1) compound:

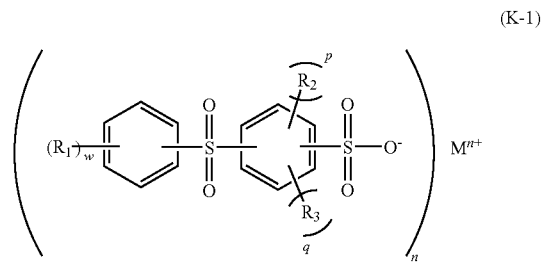

wherein $R_1$, $R_2$, and $R_3$ are independently selected from a $C_1$-$C_6$ alkyl group such as methyl and ethyl; M is a metal (e.g., alkali metal such as sodium, potassium, and so forth); n is an integer and $1 \leqq n \leqq 3$; w is an integer and $0 \leqq w \leqq 5$; p and q are integers, and $p \geqq 0$, $q \geqq 0$, and $p+q \leqq 4$.

For example, in formula (K-1), M can be potassium, n=1, and w=p=q=0. The component (ii) of the thermoplastic composition is therefore potassium diphenylsulphone sulphonate (KSS), e.g. a formula (K-2) compound:

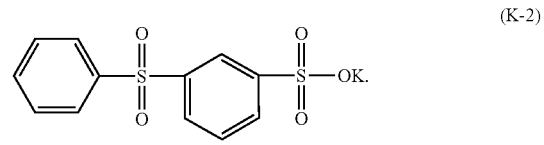

The aromatic sulphone sulphonate can be present in the final composition in quantities effective to achieve the requirements for use in aircraft compartment interiors. Suitable amounts of the KSS additive will vary, and can depend on, for example, the desired flame retardance, the amount of polycarbonate resin present, and the amount of the brominated polycarbonate resin and the aromatic sulphonate included in the composition. Exemplary amounts of aromatic sulphone sulphonate present in the thermoplastic composition can be 0.01 percent by weight (wt %) to 0.6 wt %, specifically 0.1 wt % to 0.4 wt %, and more specifically 0.25 wt % to 0.35 wt % (e.g., 0.3 wt %), based on the total weight of the thermoplastic composition.

The aromatic sulphonate in the thermoplastic composition can be an alkali metal salt. For example the can comprises a formula (N-1) compound:

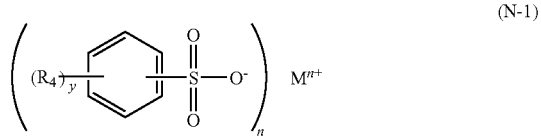

wherein $R_4$ is a $C_1$-$C_6$ alkyl group such as methyl and ethyl; M is a metal (e.g., alkali metal such as sodium, potassium, and so forth); n is an integer and $1 \leq n \leq 3$; y is an integer and $0 \leq y \leq 5$.

For example, in formula (N-1), $R_4$ can be a p-methyl group, M can be sodium, n=1, and y=1. The component (iii) of the thermoplastic composition can therefore be a formula (N-2) compound, or a sodium salt of toluene sulfonic acid (NaTS):

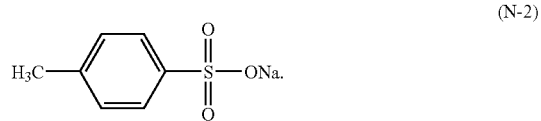

Like the aromatic sulphone sulphonate, suitable amounts of the aromatic sulphonate (e.g., NaTS) will vary. The aromatic sulphone sulphonate concentrations can depend on, for example, desired flame prevention, the amount of polycarbonate resin present, and the amount of the brominated polycarbonate resin and the aromatic sulphone sulphonate included in the composition. Exemplary amounts of aromatic sulphonate present in the final thermoplastic composition can be 0.01 wt % to 0.1 wt %, specifically 0.02 wt % to 0.06 wt %, and more specifically 0.03 to 0.05 wt % (e.g., 0.04 wt %), based on the total weight of the thermoplastic composition. One factor for limiting the amount of aromatic sulphonate in the composition can be desired optical properties. As will be discussed in greater detail below, for some aircraft interior applications the transparency of the polycarbonate sheet can be an important consideration. Too much aromatic sulphonate in the composition can increase the haze in a sheet product. Care should be given, therefore, to desired haze levels when determining the amount of aromatic sulphonate for the composition.

The composition herein comprises less of the brominated polycarbonate than is found in current flame retardant polycarbonate compositions used in aircraft interiors. The brominated polycarbonate can be present in the composition in an amount effective to satisfy the flammability test, without negatively impacting the smoke density test. Brominated polycarbonate concentrations can depend on, for example, the desired flame retardance and smoke generation properties of the final composition, the amount of polycarbonate resin present, and the amount of the aromatic sulphonate (e.g., NaTS) and aromatic sulphone sulphonate (e.g., KSS) included in the composition. In an exemplary embodiment, the brominated polycarbonate has a bromine content of 24 wt % to 28 wt % (e.g., 26 wt %). Exemplary amounts of brominated polycarbonate, containing 26 wt % bromine, in the thermoplastic composition can be 1 wt % to 10 wt %, specifically 2 wt % to 8 wt %, and more specifically 4 wt % to 6 wt %, based on the total weight of the composition. In other words, the polycarbonate composition can comprise 0.26 wt % to 2.6 wt %, specifically 0.52 wt % to 2.08 wt %, and more specifically 1.04 wt % to 1.56 wt % bromine, based on the total weight of the composition.

The brominated polycarbonates present in the thermoplastic composition can be a high molecular weight, flame retardant, thermoplastic, aromatic polymer having a weight average molecular weight (Mw) of 8,000 to more than 200,000, specifically of 20,000 to 80,000, and an intrinsic viscosity of 0.40 to 1.0 dl/g as measured in methylene chloride at 25° C. The brominated polycarbonate can be branched or unbranched.

In an exemplary embodiment, the brominated polycarbonate is derived from brominated dihydric phenols and carbonate precursors. Alternatively, the brominated polycarbonate can be derived from a carbonate precursor and a mixture of brominated and non-brominated aromatic dihydric phenols. Flame retardant brominated polycarbonates are disclosed, for example, in U.S. Pat. Nos. 4,923,933, 4,170,711, and 3,929,908.

Exemplary brominated dihydric phenols can include 2,2-bis(3,5-dibromo-4-hydroxyphenyl)propane and 2,2',6,6'-tetramethyl-3,3',5,5'-tetrabromo-4,4'-biphenol. Exemplary non-brominated dihydric phenols for mixing with brominated dihydric phenols to produce brominated polycarbonates can include, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, and (3,3'-dichloro-4,4'-dihydroxydiphenyl)methane. Mixtures of two or more different brominated and non-brominated dihydric phenols can be used. Branched brominated polycarbonates can also be used, as can blends of a linear brominated polycarbonate and a branched brominated polycarbonate.

The carbonate precursor can be a carbonyl halide. The carbonyl halides which can be used are carbonyl bromide, carbonyl chloride, and mixtures thereof.

The brominated polycarbonates used in the flame retardant thermoplastic composition as described herein can be manufactured according to procedures known in the art, such as, for example, by reacting a brominated dihydric phenol, or a mixture of brominated dihydric phenol and a non-brominated dihydric phenol, with a carbonate precursor such as diphenyl carbonate or phosgene in accordance with the methods set forth, for example, in U.S. Pat. Nos. 4,081,750 and 4,123,436. If a mixture of dihydric phenols is used, then exemplary mixtures contain greater than or equal to 25 percent of a brominated dihydric phenol; specifically 25 to 55 mole percent of a brominated dihydric phenol so as to render a flame retardant brominated polycarbonate. In an exemplary embodiment, the polycarbonate is derived from a dihydric phenol composition containing 25 to 35 mole percent of a brominated dihydric phenol and 75 to 65 mole percent of a non-brominated dihydric phenol.

An aromatic brominated polycarbonate can be prepared by using a monofunctional molecular weight regulator, an acid acceptor and a catalyst, along with the brominated polycarbonate bisphenol. The molecular weight regulators which can be used include phenol, alkylated phenols, such as 4-(1,1,3,3-tetramethylbutyl)phenol, para-tertiary-butyl-phenol, 4-cumyl phenol, and the like. In an exemplary embodiment, phenol or an alkylated phenol is used as the molecular weight regulator.

The acid acceptor can be either an organic or an inorganic acid acceptor. An exemplary organic acid acceptor is a tertiary amine and can include such materials as pyridine, triethylamine, dimethylaniline, tributylamine, and the like. The inorganic acid acceptor can be one which can be either a hydroxide, a carbonate, a bicarbonate, or a phosphate of an alkali or alkaline earth metal.

The catalysts which can be used are those that can aid the polymerization of the monomer with phosgene. Exemplary catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride, and quaternary phosphonium compounds such as, for example, n-butyltriphenyl phosphonium bromide, and methyltriphenyl phosphonium bromide.

The aromatic sulphone sulphonate (e.g., KSS), aromatic sulphonate (e.g., NaTS), and brominated polycarbonate are added to a polycarbonate resin to form the thermoplastic composition. As used herein, the term "polycarbonate" means compositions having repeating structural carbonate units of formula (II):

(II)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from a dihydroxy compound of the formula HO—$R^1$—OH, in particular of formula (III):

$$HO\text{-}A^1\text{-}Y^1\text{-}A^2\text{-}OH \qquad (III)$$

wherein each of $A^1$ and $A^2$ is a monocyclic divalent aromatic group and $Y^1$ is a single bond or a bridging group having one or more atoms that separate $A^1$ from $A^2$. In an exemplary embodiment, one atom separates $A^1$ from $A^2$. Specifically, each $R^1$ can be derived from a dihydroxy aromatic compound of formula (IV):

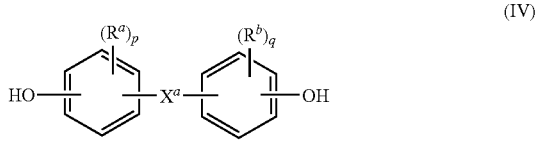

(IV)

wherein $R^a$ and $R^b$ each represent a halogen or $C_{1-12}$ alkyl group and can be the same or different; and p and q are each independently integers of 0 to 4. It will be understood that $R^a$ is hydrogen when p is 0, and likewise $R^b$ is hydrogen when q is 0. Also in formula (IV), $X^a$ represents a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In one embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C(R$^c$)(R$^d$)— wherein R$^c$ and R$^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent $C_{1-12}$ hydrocarbon group.

Other useful aromatic dihydroxy compounds of the formula HO—$R^1$—OH include compounds of formula (V):

(V)

wherein each R$^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis (4-hydroxyphenyl)methane, bis(4-hydroxyphenyl)diphenylmethane, bis(4-hydroxyphenyl)-1-naphthylmethane, 1,2-bis (4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (IV) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, 2,2-bis(4-hydroxy-2-methylphenyl) propane, 1,1-bis(4-hydroxy-t-butylphenyl)propane, 3,3-bis(4-hydroxyphenyl) phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (IV).

Exemplary aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

Polycarbonates can be manufactured by processes such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Exemplary carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. An effective amount of a phase transfer catalyst can be 0.1 to 10 wt % based on the weight of bisphenol in the phosgenation mixture. In another embodiment an effective amount of phase transfer catalyst can be 0.5 to 2 wt % based on the weight of bisphenol in the phosgenation mixture.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %. Mixtures comprising linear polycarbonates and branched polycarbonates can be used.

Alternatively, melt processes can be used to make the polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

The polyester-polycarbonates can also be prepared by interfacial polymerization. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

As mentioned throughout, the flame retardant thermoplastic polycarbonate composition can be employed in a variety of aircraft compartment interior applications, as well as interior applications for other modes of transportation, such as bus, train, subway, and the like. Exemplary aircraft interior components can include, without limitation, partition walls, cabinet walls, sidewall panels, ceiling panels, floor panels, equipment panels, light panels, window moldings, window slides, storage compartments, galley surfaces, equipment housings, seat housings, speaker housings, duct housing, storage housings, shelves, trays, and the like. The flame retardant thermoplastic polycarbonate compositions can be formed into sheets that can be used for any of the above mentioned components. It is generally noted that the overall size, shape, thickness, optical properties, and the like of the flame retardant polycarbonate sheet can vary depending upon the desired application.

In some interior compartment applications, it can be desirable for the flame retardant polycarbonate sheet to have certain optical properties. For example, it can be desirable to have a transparent flame retardant sheet. With regards to the transparency of the flame retardant polycarbonate sheet, it is briefly noted that end user specifications (e.g., commercial airline specifications) generally specify that the component satisfy a particular predetermined threshold. Haze values, as measured by ANSI/ASTM D1003-00, can be a useful determination of the optical properties of the transparent flame retardant polycarbonate sheet. The lower the haze levels, the better the transparency of the finished sheet. Flame retardant additives, e.g. NaTS, can have an impact on the haze of the final thermoplastic sheet. Therefore, it is desirable to monitor the haze levels of the sheet along with flammability and smoke generation properties in order to produce an aircraft interior component that satisfies both safety and aesthetic quality specifications. Exemplary haze levels for the transparent flame retardant polycarbonate sheet described herein, when measured at a thickness of 5.0 millimeters (mm), can be 0% to 6%, specifically 0.5% to 4%, and more specifically 1% to 2.5%. It is further noted that the transparency can be greater than or equal to 60%, specifically, greater than or equal to 75%, more specifically, greater than or equal to 90%, as measured in accordance with ASTM D1003-00, Procedure A, illuminant C.

Methods for forming the flame retardant thermoplastic composition can vary. In one embodiment, the polymer resin, the aromatic sulphonate, aromatic sulphone sulphonate, and the brominated polycarbonate resin are blended together, such as, for example, in a screw-type extruder. The additives and resin can be combined in any form, for example, powder, granular, filamentous, and the like. The aromatic sulphonate and aromatic sulphone sulphonate can be added to the polycarbonate composition in any manner suitable for forming a flame retardant thermoplastic composition as described herein. In one embodiment, for example, the aromatic sulphonate and aromatic sulphone sulphonate can be added to the polycarbonate resin together in an extruder configured to compound the mixture. The aromatic sulphonate can be added to the polycarbonate resin and aromatic sulphone sulphonate in a solution. An exemplary solvent for the aromatic sulphonate solution can be water. The composition blend can then be extruded and pelletized. The pellets can be suitable for molding into thermoplastic interior parts, or they can be used in forming a sheet of the flame retardant thermoplastic composition.

The disclosure is further illustrated by the following Examples. It should be understood that the non-limiting examples are merely given for the purpose of illustration. Unless otherwise indicated, all parts and percentages are by weight based upon the total weight of the flame retardant polycarbonate composition.

EXAMPLES

In the examples below, the following terms have the meanings set forth below in Table 1.

TABLE 1

| Material | Chemical name | Supplier |
|---|---|---|
| PC—Br | Co-polymer of TBBPA (Tetrabromo bisphenol acetone) and BPA containing 26 wt % bromine with a melt flow of 5-8 g/10 min (ASTM D1238, 300° C., 2.16 kg) | SABIC Innovative Plastics |

TABLE 1-continued

| Material | Chemical name | Supplier |
|---|---|---|
| KSS | Potassium diphenyl sulfon-3-sulphonate | Arichem LLC |
| NaTS | Sodium p-toluene sulphonate | Arichem LLC |
| RDP | Tetraphenyl resorcinol diphosphate | Great Lakes |
| PC | Linear polycarbonate resin, Mw of approximately 30,500 and an Intrinsic viscosity of 58.5 | SABIC Innovative Plastics |
| Rimar salt | Potassium perfluorobutane sulphonate | 3M |

Haze level, flammability, and smoke density tests were conducted for various combinations of the materials listed in Table 1. The results are set forth below in each of the examples. The various formulations were prepared by compounding on a Werner and Pfleider ZSK 25 mm intermeshing twin screw extruder at 300 revolutions per minute (rpm) and at a throughput of 20 kilograms per hour (kg/hr) with a torque of 75%. The barrel temperature settings from feed throat toward the direction of the twin strand die were set at 40-150-250-285-300-300-300-300° C. respectively for each heating zone. The die temperature was set at 300° C. The polymer strand was cooled by a water bath prior to pelletization. The tests were conducted on 2 and 3 millimeter (mm) thick sheets of the flame retardant polycarbonate composition formed from the pellets. The sheets had dimensions of 75 mm×305 mm. The flammability tests were conducted in accordance with FAR 25.853 Appendix F, Part I(a)(1)(ii). While there are no specific requirements on preparation of the sheets for the tests, the size of the sheets samples were measured carefully for exact dimensions. A successful flammability test will have a burn length of less than 150 mm, a drip flame time of less than 3 seconds, and an overall flame time of less than 15 seconds. The smoke density tests were conducted in accordance with ASTM E662-06. For this test, measurement was made of the attenuation of a light beam by smoke (suspended solid or liquid particles) accumulating within a closed chamber due to non-flaming pyrolytic decomposition and flaming combustion. For the test, a 3 inch by 3 inch (7.62 cm by 7.62 cm) sample was mounted within an insulated ceramic tube with an electrically heated radiant-energy source mounted therein. To satisfy aircraft requirements, a successful smoke density test is below 200 at an exposure period of 240 seconds as measured by a photometric system. Finally, all haze levels, unless specifically set forth to the contrary, were measured in accordance with ASTM D1003-00, procedure A, illuminant C using a Hazeguard dual from Byk Gardner, on 5 millimeter (mm) thick parts. While optimum haze levels will vary between aircraft manufacturers, it is generally accepted that the lower the haze level, the better for transparent polycarbonate sheet applications.

Example 1

Haze Level

Various flame retardant polycarbonate formulations were measured for haze, and the results are shown below in Table 2.

TABLE 2

| | | Sample | | | | | | | | |
|---|---|---|---|---|---|---|---|---|---|---|
| | | 1 | 2 | 3 | 4 | 5 | 6 | 7 | 8 | 9 |
| Polycarbonate | % | 100 | 99.98 | 99.95 | 99.96 | 99.93 | 99.68 | 99.94 | 99.91 | 99.66 |
| KSS | % | — | — | 0.035 | — | 0.035 | 0.28 | — | 0.035 | 0.28 |
| NaTS | % | — | 0.02 | 0.02 | 0.04 | 0.04 | 0.04 | 0.06 | 0.06 | 0.06 |
| Haze | % | 0.3 | 2.3 | 0.6 | 4.5 | 1.2 | 1.1 | 7.6 | 2.5 | 2.4 |

Sample 1 is a comparative example, containing no flame retardant additives or brominated polycarbonate resin. Samples 2-9 contained various combinations of the NaTS with and without the KSS. As seen in Samples 2, 4, and 7, an increase in the amount of NaTS additive in the composition increased the haze level of the sheet. Combining the KSS with the NaTS in the polycarbonate composition, however, was effective to improve (i.e., reduce) the haze levels compared to samples having just NaTS alone. Samples 5 and 6 represented acceptable haze levels, while still imparting the desired safety characteristics to the sheet.

Comparative Example 2

Rimar Salt as Flame Retardant Additive

In this example, Rimar salt and brominated polycarbonate (PC—Br) were added to polycarbonate sheet compositions. Rimar salt was used to see the effect of an organic flame retardant salt other than KSS on the flammability and smoke generation properties of the polycarbonate sheet. Formulations of the polycarbonate sheet included samples with just Rimar salt (Samples 10, 11); just brominated polycarbonate (Samples 14, 15); and a combination of both the flame retardant additives (Samples 12, 13). Flammability and smoke tests were conducted for the various formulations, and the results are shown below in Tables 3 and 4. Table 3 discloses the results of the tests in terms of pass or fail. For example, if the sheet passed the smoke density test with less than 200 at a time of 240 seconds, then "PASS" was recorded in the table. Table 4 discloses the actual numerical values of the test results, for comparison purposes.

TABLE 3

| | Samples | | | | | |
|---|---|---|---|---|---|---|
| | 10 | 11 | 12 | 13 | 14 | 15 |
| | | | Formulations | | | |
| | 0.1 wt % Rimar | 0.1 wt % Rimar | 5 wt % PC-Br; 0.04 wt % Rimar | 5 wt % PC-Br; 0.04 wt % Rimar | 12 wt % PC-Br | 12 wt % PC-Br |
| | | | Sheet thickness | | | |
| | 3 mm | 2 mm | 3 mm | 2 mm | 3 mm | 2 mm |
| SMOKE DENSITY TEST | FAIL | FAIL | FAIL | FAIL | FAIL | FAIL |
| FLAMMABILITY | | | | | | |
| burn length (<150 mm) | PASS | PASS | PASS | PASS | PASS | PASS |
| drip flame time (<3 sec) | FAIL | FAIL | FAIL | FAIL | PASS | PASS |
| flame time (<15 sec) | FAIL | PASS | PASS | PASS | PASS | PASS |

TABLE 4

| | Samples | | | | | |
|---|---|---|---|---|---|---|
| | 10 | 11 | 12 | 13 | 14 | 15 |
| | | | Formulations | | | |
| | 0.1 wt % Rimar | 0.1 wt % Rimar | 5 wt % PC-Br; 0.04% Rimar | 5 wt % PC-Br; 0.04% Rimar | 12 wt % PC-Br | 12 wt % PC-Br |
| | | | Sheet thickness | | | |
| | 3 mm | 2 mm | 3 mm | 2 mm | 3 mm | 2 mm |
| SMOKE DENSITY TEST | 245 | 276 | 312 | 364 | 470 | 334 |
| FLAMMABILITY | | | | | | |
| burn length (<150 mm) | 57.3 | 64.3 | 72.3 | 73.3 | 77.3 | 80.0 |
| drip flame time (<3 sec) | 5.7 | 8.2 | 3.4 | 4.0 | 2.9 | 2.1 |
| flame time (<15 sec) | 17.0 | 5.0 | 7.0 | 7.0 | 7.0 | 14.3 |

Samples 10 and 11 included only the Rimar salt additive, with no brominated polycarbonate. These samples failed the smoke density test, and could not meet all the requirements of the flammability test. Samples 14 and 15 included only the brominated polycarbonate, with no Rimar salt. These samples failed the smoke density tests. Sample 14 (3 mm sheet thickness), however, was also able to pass the flammability test, although the 2 mm sheet of the same composition failed some of the flammability tests (Sample 15). Samples 12 and 13 combined both flame retardant additives with the polycarbonate. Both of these samples failed the smoke density test and the flammability test. The Rimar salt was ineffective in sufficiently reducing the smoke generation of the polycarbonate sheet to meet the smoke density test requirements. The Rimar salt and the brominated polycarbonate, alone and in combination, were not able to produce a flame retardant polycarbonate sheet meeting the smoke and flammability requirements for aircraft interiors.

Example 3

KSS without NaTS

In this example, KSS and brominated polycarbonate (PC—Br) were added to polycarbonate sheet compositions. Formulations of the polycarbonate sheet included samples having 0.1 wt % to 4 wt % PC—Br and 0.25 wt % to 0.3 wt % KSS. None of the samples included the NaTS. Flammability and smoke tests were conducted for the various formulations, and the results are shown below in Tables 5 and 6. Like the previous comparative example, Table 5 discloses the results of the tests in terms of pass or fail, while Table 6 shows the actual test results.

Samples 16 through 18 contained 1 wt % or less of the PC—Br combined with 0.25 wt % of the KSS. These samples were able to pass the smoke density test. Sample 19 was able to pass the smoke density test despite a higher (4%) bromine content. Unlike the Rimar salt, the KSS is effective in helping control the smoke generation, despite the increase in bromine content compared to Samples 16-18. All of these samples, however, failed the flame spread test FAR 25.853.

Example 4

Brominated Polycarbonate with KSS and NaTS

In this example, NaTS was combined with both the KSS and the brominated polycarbonate (PC—Br) to form flame retardant polycarbonate compositions. At first, the samples were formed into 3 mm thick molded plaques, and smoke and flammability tests were conducted. A range of the higher PC—Br concentrations (4 wt % to 6 wt %) were chosen based on the previous example showing that the smoke density could be held to allowable limits by addition of the KSS. Likewise, the same amount of KSS was used as in Example 3. Various amounts of NaTS, along with RDP in some samples, were added to the formulations and tested. The haze levels were also recorded. The results are shown below in Tables 7 and 8.

TABLE 5

| Samples | 16 | 17 | 18 | 19 |
|---|---|---|---|---|
| Formulations | 0.5 wt % PC—Br | 0.1 wt % PC—Br | 1 wt % PC—Br | 4 wt % PC—Br |
|  | 0.25 wt % KSS | 0.25 wt % KSS | 0.25 wt % KSS | 0.3 wt % KSS |
|  | Linear PC | Linear PC | Branched PC | Linear PC |
| Sheet thickness | 3 mm | 3 mm | 3 mm | 3 mm |
| SMOKE DENSITY TEST | PASS | PASS | PASS | PASS |
| FLAMMABILITY TEST |  |  |  |  |
| burn length (<150 mm) | PASS | PASS | PASS | PASS |
| drip flame time (<3 sec) | FAIL | FAIL | FAIL | FAIL |
| flame time (<15 sec) | PASS | PASS | FAIL | PASS |

TABLE 6

| Samples | 16 | 17 | 18 | 19 |
|---|---|---|---|---|
| Formulations | 0.5 wt % PC—Br | 0.1 wt % PC—Br | 1 wt % PC—Br | 4 wt % PC—Br |
|  | 0.25 wt % KSS | 0.25% KSS | 0.25 wt % KSS | 0.3 wt % KSS |
|  | Linear PC | Linear PC | Branched PC | Linear PC |
| Sheet thickness | 3 mm | 3 mm | 3 mm | 3 mm |
| SMOKE DENSITY TEST | 69.9 | 160.3 | 78.5 | 141 |
| FLAMMABILITY TEST |  |  |  |  |
| burn length (<150 mm) | 82.3 | 81.0 | 82.7 | 138.0 |
| drip flame time (<3 sec) | 7.2 | 8.5 | 8.0 | 4.0 |
| flame time (<15 sec) | 9.3 | 14.3 | 16.0 | 11.0 |

TABLE 7

| | Samples | | | | | |
|---|---|---|---|---|---|---|
| | 20 | 21 | 22 | 23 | 24 | 25 |
| | Formulations | | | | | |
| | 4 wt % PC-Br 0.3 wt % KSS 0.04 wt % NaTS | 4 wt % PC-Br 0.3 wt % KSS 0.08 wt % NaTS | 4 wt % PC-Br 0.3 wt % KSS 0.04 wt % NaTS 0.1 wt % RDP | 6 wt % PC-Br 0.3 wt % KSS 0.04 wt % NaTS | 6 wt % PC-Br 0.3 wt % KSS 0.08 wt % NaTS | 6 wt % PC-Br 0.3 wt % KSS 0.04 wt % NaTS 0.1 wt % RDP |
| | Plaque thickness | | | | | |
| | 3 mm | 3 mm | 3 mm | 3 mm | 3 mm | 3 mm |
| SMOKE DENSITY TEST | PASS | PASS | PASS | PASS | PASS | PASS |
| FLAMMABILITY TEST | | | | | | |
| burn length (<150 mm) | PASS | PASS | PASS | PASS | PASS | PASS |
| drip flame time (<3 sec) | PASS | PASS | FAIL | PASS | FAIL | PASS |
| flame time (<15 sec) | PASS | PASS | PASS | PASS | PASS | PASS |

TABLE 8

| | Samples | | | | | |
|---|---|---|---|---|---|---|
| | 20 | 21 | 22 | 23 | 24 | 25 |
| | Formulations | | | | | |
| | 4 wt % PC-Br 0.3 wt % KSS 0.04 wt % NaTS | 4 wt % PC-Br 0.3 wt % KSS 0.08 wt % NaTS | 4 wt % PC-Br 0.3 wt % KSS 0.04 wt % NaTS 0.1 wt % RDP | 6 wt % PC-Br 0.3 wt % KSS 0.04 wt % NaTS | 6 wt % PC-Br 0.3 wt % KSS 0.08 wt % NaTS | 6 wt % PC-Br 0.3 wt % Br 0.04 wt % NaTS 0.1 wt % RDP |
| | Plaque thickness | | | | | |
| | 3 mm | 3 mm | 3 mm | 3 mm | 3 mm | 3 mm |
| HAZE (%) | 2.8% | 6.56% | 3.41% | 1.62% | 6.72% | 2.13% |
| SMOKE DENSITY TEST | 141.3 | 157.5 | 196.8 | 157.8 | 149.4 | 187.0 |
| FLAMMABILITY TEST | | | | | | |
| burn length (<150 mm) | 67.7 | 64.7 | 70.0 | 70.0 | 66.3 | 70.0 |
| drip flame time (<3 sec) | 1.5 | 2.8 | 4.7 | 1.5 | 4.8 | 1.9 |
| flame time (<15 sec) | 10.9 | 5.1 | 9.1 | 9.2 | 5.8 | 5.8 |

As seen from the tables, all of the samples passed the smoke density test. With the exception of Samples 22 and 24, all of the samples also passed the flammability tests. It seems that RDP is detrimental to both the smoke density and flammability tests. Sample 22 failed having RDP in combination with a lower PC—Br content. Also, Sample 24 did not have enough of the NaTS combined with the specific PC—Br and KSS concentrations to bass the flammability test. In general, however, the presence of the NaTS combined with the KSS was effective in overcoming the decrease in flame retardancy normally associated with lower concentrations of bromine. Unlike, the samples in Example 3, the polycarbonate formulations of Example 4 were able to meet both the smoke density and flammability requirements, despite the lower percentage of bromine in the composition. It is noted in Sample 25 that a greater amount of the bromine was needed to meet pass the tests when a small amount of resorcinol was present (see Sample 22).

As anticipated, however, the samples containing the higher levels of NaTS (Samples 3 and 7 (0.08 wt %)) had unacceptable haze levels for current aircraft interior applications. (See Table 8). But Samples 2 and 6 passed the smoke density and flammability tests with half the amount of NaTS in the composition. The haze levels for these samples were more desirable.

Based on the encouraging results of Example 4, Sample 2 was selected to be produced in sheet form. The formulation of Sample 2 was blended and extruded into 2 mm and 3 mm-thick sheets to further evaluate the smoke density and flammability properties; the results of which are shown in Table 9 below.

TABLE 9

| Samples | 26 | 27 |
|---|---|---|
| Formulations | 4 wt % PC—Br 0.3 wt % KSS 0.04 wt % NaTS | 4 wt % PC—Br 0.3 wt % KSS 0.04 wt % NaTS |
| Sheet thickness | 2 mm | 3 mm |

TABLE 9-continued

| Samples | 26 | 27 |
|---|---|---|
| SMOKE DENSITY TEST | PASS | PASS |
| FLAMMABILITY TEST | | |
| burn length (<150 mm) | PASS | PASS |
| drip flame time (<3 sec) | PASS | PASS |
| flame time (<15 sec) | PASS | PASS |
| SMOKE DENSITY TEST | 140 | 128 |
| FLAMMABILITY TEST | | |
| burn length (<150 mm) | 64.0 | 49.3 |
| drip flame time (<3 sec) | 3.0 | 3.0 |
| flame time (<15 sec) | 4.2 | 11.7 |

Like the molded sample, both sheet samples pass the smoke density and flammability tests. The sheet samples, whether extruded and cross extruded, passed all of the tests, further solidifying the value of employing a combination of NaTS and KSS with brominated polycarbonate to produce a sheet from the flame retardant thermoplastic composition (e.g., a transparent flame retardant polycarbonate composition) having a haze of less than or equal to 4%, specifically, less than or equal to 3%, more specifically, less than or equal to 2%.

Advantageously, the thermoplastic compositions herein comprise less halogenated material than current flame retardant polycarbonate compositions, while still being able to meet the smoke and flammability requirements for use in aircraft interiors. By reducing the amount of halogen flame retardant (e.g., bromine) in the composition, the thermoplastic sheet as described herein is better able to satisfy the smoke density and other requirements set for use in aircraft interiors. The unique combination of NaTS and KSS with the brominated polycarbonate produce a flame retardant sheet capable of meeting stringent fire safety guidelines, while also being able to satisfy airline-specific smoke and optical requirements.

Ranges disclosed herein are inclusive and combinable (e.g., ranges of "up to 25 wt %, or, more specifically, 5 wt % to 20 wt %", is inclusive of the endpoints and all intermediate values of the ranges of "5 wt % to 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A thermoplastic resin composition, comprising:
a transparent polycarbonate resin;
an aromatic sulphonate;
an aromatic sulphone sulphonate different from the aromatic sulphonate; and
a brominated polycarbonate resin;
wherein the composition, when in the form of a 3 mm thick extruded sheet, is transparent and has a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii); and
wherein the composition, when in the form of a 5 mm thick extruded sheet, has a haze of 0% to 6% as measured in accordance with ASTM D1003-00, Procedure A, illuminant C.

2. The composition of claim 1, wherein the aromatic sulphone sulphonate is present in an amount of 0.01 wt % to 0.6 wt %, based on the total weight of the composition.

3. The composition of claim 2, wherein the aromatic sulphone sulphonate is present in an amount of 0.1 wt % to 0.4 wt %, based on the total weight of the composition.

4. The composition of claim 1, wherein the aromatic sulphonate is present in an amount of 0.01 wt % to 0.1 wt %, based on the total weight of the composition.

5. The composition of claim 4, wherein the aromatic sulphonate is present in an amount of 0.02 wt % to 0.06 wt %, based on the total weight of the composition.

6. The composition of claim 1, wherein the brominated polycarbonate comprises 24 wt % to 28 wt % bromine, based on the total weight of the brominated polycarbonate.

7. The composition of claim 6, wherein the brominated polycarbonate is present in an amount of 1 wt % to 10 wt %, based on the total weight of the composition.

8. The composition of claim 7, wherein the brominated polycarbonate is present in an amount of 2 wt % to 8 wt %, based on the total weight of the polycarbonate resin.

9. The composition of claim 1, wherein the aromatic sulphone sulphonate comprises an alkali metal diphenyl sulphone sulphonate and the aromatic sulphonate comprises an alkali metal salt of toluene sulfonic acid.

10. The composition of claim 1, wherein the aromatic sulphonate comprises a sodium salt of toluene sulfonic acid.

11. The composition of claim 1, wherein the aromatic sulphone sulphonate comprises potassium diphenyl sulphone sulphonate.

12. A thermoplastic composition, comprising:
0.01 wt % to 0.1 wt % sodium toluene sulphonic acid;
0.01 wt % to 0.6 wt % potassium diphenyl sulphon-3-sulphonate;
a brominated polycarbonate resin, in an amount such that the composition comprises 0.26 wt % to 2.6 wt % bromine; and
a polycarbonate resin;
wherein when the composition is formed into a 3 mm thick extruded sheet, the sheet has a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii);

wherein the thermoplastic composition, when in the form of a 5 mm thick extruded sheet, has a haze of 0% to 6% as measured in accordance with ASTM D1003-00, Procedure A, illuminant C.

13. A sheet comprising:
a transparent thermoplastic composition, comprising:
0.01 wt % to 0.1 wt % aromatic sulphonate;
0.01 wt % to 0.6 wt % aromatic sulphone sulphonate;
a brominated polycarbonate resin, in an amount such that the composition comprises 0.26 wt % to 2.6 wt % bromine; and
a polycarbonate resin;
wherein the thermoplastic composition is in the form of a transparent sheet;
wherein when the composition is formed into a 3 mm thick extruded sheet, the sheet has a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii); and
wherein the composition, when in the form of a 5 mm thick extruded sheet, has a haze of 0% to 6% as measured in accordance with ASTM D1003-00, Procedure A, illuminant C.

14. The sheet of claim 13, wherein the aromatic sulphone sulphonate comprises potassium diphenyl sulphone sulphonate in an amount of 0.1 wt % to 0.4 wt %, and the aromatic sulphonate comprises a sodium salt of toluene sulfonic acid in an amount of 0.01 wt % to 0.1 wt %, based on the total weight of the composition.

15. The sheet of claim 13, wherein the aromatic sulphonate is present in an amount of 0.02 wt % to 0.06 wt % based on the total weight of the composition, and the composition comprises 0.52 wt % to 2.08 wt % bromine.

16. An aircraft interior component comprising the sheet of claim 13.

17. The sheet of claim 13, wherein the sheet has a haze level of less than or equal to 4% as measured in accordance with ASTM D1003-00, Procedure A, illuminant C.

18. A sheet comprising:
transparent thermoplastic resin composition, comprising:
a polycarbonate resin;
an aromatic sulphonate;
an aromatic sulphone sulphonate; and
a brominated polycarbonate resin;
wherein when the composition is formed into a 3 mm thick extruded sheet, the sheet has a smoke density of less than 200 at an exposure period of 240 seconds in accordance with the smoke density test as set forth in ASTM E662-06, and a burn length of less than 150 mm, a drip flame time of less than 3 seconds, and an overall flame time of less than 15 seconds in accordance with the flammability test as set forth in 14 C.F.R. 25.853, Appendix F, Part I(a)(1)(ii); and
wherein the composition, when in the form of a 5 mm thick extruded sheet, has a haze of 0% to 6% as measured in accordance with ASTM D1003-00, Procedure A, illuminant C.

19. The sheet of claim 18, wherein the sheet has a haze level of less than or equal to 4% as measured in accordance with ASTM D1003-00, Procedure A, illuminant C.

20. The sheet of claim 18, wherein the aromatic sulphone sulphonate comprises potassium diphenyl sulphone sulphonate and the aromatic sulphonate comprises a sodium salt of toluene sulfonic acid.

21. The composition of claim 1, wherein, the haze is less than or equal to 4%.

22. The composition of claim 21, wherein the haze is 0.5% to 4%.

23. The sheet of claim 18, wherein the haze is less than or equal to 4%.

24. The composition of claim 1, wherein, when in the form of a 5.0 mm sheet, has a transparency of greater than or equal to 60%, as measured in accordance with ASTM D1003-00, Procedure A, illuminant C.

25. The composition of claim 24, wherein the transparency is greater than or equal to 75%.

26. The composition of claim 24, wherein the transparency is greater than or equal to 90%.

27. The composition of claim 1, wherein the aromatic sulphonate comprises a sodium salt of toluene sulfonic acid in an amount of 0.02 wt % to 0.06wt %, the aromatic sulphone sulphonate comprises potassium diphenyl sulphone sulphonate in an amount of 0.1 wt % to 0.4wt %, and 0.25wt % to 2.5 wt % bromine, all based on the total weight of the composition.

28. The composition of claim 1, wherein the aromatic sulphonate comprises a sodium salt of toluene sulfonic acid in an amount of 0.01 wt % to 0.1wt %, the aromatic sulphone sulphonate comprises potassium diphenyl sulphone sulphonate in an amount of 0.lwt % to 0.4wt %, and 0.25wt % to 2.5wt % bromine, all based on the total weight of the composition.

29. The composition of claim 1, wherein the composition comprises 1.04 to 1.56 wt % bromine.

* * * * *